United States Patent
Razin et al.

(10) Patent No.: US 10,089,236 B2
(45) Date of Patent: Oct. 2, 2018

(54) APPARATUS AND METHOD OF PERFORMING AGENTLESS REMOTE IO CATCHING ANALYSIS, PREDICTION, AUTOMATION, AND RECOMMENDATION IN A COMPUTER ENVIRONMENT

(71) Applicant: SIOS Technology Corporation, Lexington, SC (US)

(72) Inventors: Sergey A Razin, Columbia, SC (US); Yokuki To, Columbia, SC (US)

(73) Assignee: SIOS Technology Corporation, Lexington, SC (US)

( * ) Notice: Subject to any disclaimer, the term of this patent is extended or adjusted under 35 U.S.C. 154(b) by 123 days.

(21) Appl. No.: 15/209,000

(22) Filed: Jul. 13, 2016

(65) Prior Publication Data
US 2017/0017575 A1  Jan. 19, 2017

Related U.S. Application Data

(60) Provisional application No. 62/191,799, filed on Jul. 13, 2015.

(51) Int. Cl.
G06F 12/00 (2006.01)
G06F 12/0888 (2016.01)

(52) U.S. Cl.
CPC .. *G06F 12/0888* (2013.01); *G06F 2212/1016* (2013.01); *G06F 2212/264* (2013.01); *G06F 2212/507* (2013.01)

(58) Field of Classification Search
None
See application file for complete search history.

(56) References Cited

U.S. PATENT DOCUMENTS

| | | | |
|---|---|---|---|
| 8,489,816 B1* | 7/2013 | Reiner | G06F 12/0897 711/118 |
| 2012/0079097 A1* | 3/2012 | Gopisetty | G06F 9/5083 709/224 |
| 2013/0312005 A1 | 11/2013 | Chiu et al. | |
| 2015/0046653 A1 | 2/2015 | Soundararajan et al. | |

(Continued)

OTHER PUBLICATIONS

International Search Report dated Sep. 27, 2016 from corresponding International Application No. PCT/US16/042073.

*Primary Examiner* — John A Lane
(74) *Attorney, Agent, or Firm* — Duquette Law Group, LLC

(57) ABSTRACT

A host device includes a controller configured to receive input/output (IO) access information associated with an IO workload, the IO access information identifying at least one of a read action and a write action associated with the IO workload over a period of time. Based upon the received IO access information associated with the storage element, the controller is configured to derive a predicted cache access ratio associated with the IO workload and relating a predicted number of cache accesses associated with the IO workload with at least one of a total number of read actions and a total number of write actions associated with the IO workload. When the predicted cache access ratio reaches a threshold cache access ratio value, the controller is configured to identify the IO workload as an IO workload candidate for caching by the host device.

22 Claims, 8 Drawing Sheets

(56) References Cited

U.S. PATENT DOCUMENTS

2015/0046654 A1 2/2015 Soundararajan et al.
2016/0147649 A1* 5/2016 Magdon-Ismail ............................ G06F 12/0238
                                                                              711/118

* cited by examiner

| 31 Command Type | 33 Serial Number | 35 IO Data Length | 37 Num SG Entries | 39 Logical Block Number | 41 Time Stamp (ms) | 43 Command Latency (ms) |
|---|---|---|---|---|---|---|
| read | 2147483706 | 65536 | 16 | 10754944 | 13869703794208 | 154 |
| write | 2147483766 | 65536 | 16 | 10755072 | 13869703794446 | 133 |
| read | 2147483766 | 65536 | 16 | 10755072 | 13869703794446 | 133 |
| read | 2147483671 | 65536 | 16 | 10755200 | 13869703794637 | 147 |
| read | 2147483691 | 65536 | 16 | 10755200 | 13869703795665 | 152 |
| read | 2147483691 | 65536 | 16 | 10757942 | 13869703795665 | 152 |
| read | 2147483728 | 65536 | 16 | 10755200 | 13869703795871 | 147 |
| read | 2147483656 | 65536 | 16 | 10756096 | 13869703796080 | 132 |
| read | 2147483752 | 65536 | 16 | 10754944 | 13869703796263 | 446 |

FIG. 3

| Reference Count Value | Quantity Value |
|---|---|
| 1 | 1001 |
| 2 | 15 |
| 3 | 20 |
| 4 | 11 |
| 5 | 4 |
| .... | .... |
| 100 | 55 |
| 101 | 190 |
| 102 | 112 |
| .... | .... |
| 256 (or over) | .... |

FIG. 6

APPARATUS AND METHOD OF PERFORMING AGENTLESS REMOTE IO CATCHING ANALYSIS, PREDICTION, AUTOMATION, AND RECOMMENDATION IN A COMPUTER ENVIRONMENT

RELATED APPLICATIONS

This patent application claims the benefit of U.S. Provisional Application No. 62/191,799, filed on Jul. 13, 2015, entitled, "Apparatus and Method of Performing Agentless Remote IO Caching Analysis, Prediction, and Recommendation in a Computer Environment," the contents and teachings of which are hereby incorporated by reference in their entirety.

BACKGROUND

Modern economies and business services typically run complex, dynamic, and heterogeneous Information Technology (IT) of computer infrastructures. For example, computer infrastructures can include one or more servers or host devices and one or more storage arrays interconnected by communication devices, such as switches or routers. The servers can be configured to execute one or more virtual machines (VMs) during operation. Each VM is typically configured to execute or run one or more applications or workloads.

Certain computer infrastructure customers utilize remote input/output (IO) caching, such as host based caching, to improve the performance of the applications as well as to offload the computer infrastructure. For example, when writing IO to a lowest storage tier in the computer infrastructure, the host device must travel down to the lower layers in the computer infrastructure to access the blocks, which can increase latency.

Host based caching can improve the performance of applications executed by the infrastructure, such as by offloading SANs or any network attached storage, to reduce cost. Typically, conventional SANs can run out of compute capacity before it runs out of storage capacity, unlike distributed storage. Host based caching can also offload the network infrastructure (e.g., the fewer packets that travel across the network, the less pressure/load on the network). Host based caching can also increase the density of the virtualized environment. Further, with introduction of the read and write (e.g., write through and write back) cache, a customer can achieve substantially consistent latency in the infrastructure which, in the case of network attached storage can vary (e.g., on average, the latency may be 10 ms, however it may vary otherwise).

SUMMARY

Conventional remote IO caching suffers from a variety of deficiencies. For example, if a device, such as a host device, can find a requested data item within a local cache, the host device can retrieve the data item from the cache, rather than retrieving the item from a lower tier storage location within the infrastructure. However, with conventional remote IO caching, such as host based caching, it can be difficult for a systems administrator to understand workload/application behavior within the computer infrastructure, as well as relationships with the underlying components of the computer infrastructure, to select data items for caching with the host device.

Typically, for a given cache in a computer infrastructure, a cache hit relates to the availability of a requested data item within the cache and a cache hit rate relates to a percentage of cache hits relative to a total number of cache accesses for that cache. When identifying data items from the computer infrastructure to move to the local (e.g., host based) cache, the systems administrator must guess at a cache hit rate, cache size, and IO block size for a particular virtual machine (e.g., cache) within the computer infrastructure in order to determine the IO caching parameters for that virtual machine and to improve its performance. In such a case, this trial-and-error method can lead to the systems administrator mis-categorizing the workload/application behavior of the computer infrastructure which would not improve latency within the infrastructure. Accordingly, to solve the latency issue, the administrator could purchase and install additional storage devices with the computer infrastructure which are not necessarily needed. This can unnecessarily increase costs associated with the infrastructure.

Further, the above-mentioned three parameters (cache size, IO block size, and cache hit ratio) are important to take advantage of IO cache, as a mistake in the administrator's guess can lead to degradation of application performance vs. improvement. For example, the systems administrator can determine the IO caching parameters for a given cache based upon a 20% disk capacity and a 32 KB block size. However, such determination is a best-guess that, in many cases, can cause a negative effect on the application performance. For example, a best-guess which leads to an underestimation of the cache hit rate can result in a sub-optimization of remote IO caching within a computer infrastructure.

By contrast to conventional remote IO caching analysis, embodiments of the present innovation relate to an apparatus and method for performing agentless remote IO caching analysis, prediction, automation, and recommendation in a computer environment. In one arrangement, to limit latency without requiring the purchase of additional storage devices, a computerized device, such as a host device, is configured to identify blocks of IO workloads in a computer infrastructure that are candidates to be cached by the host device. For example, the host device can be configured, such as by a caching utility, to identify blocks in the computer infrastructure that have been accessed, those that have been accessed repeatedly, and the IO workloads which can benefit from caching in the host device. Further, by monitoring and identifying IO workloads that are candidates for caching, the host device limits or eliminates the need for the systems administrator to guess at a cache hit rate, cache size, and IO block size for a particular IO workload in order to determine the IO caching parameters for the associated virtual machine to improve its performance.

In one arrangement, the host device is configured to monitor the host device cache to determine if it needs to be adjusted for a workload which constantly changes. For example, the host device is configured to identify the changing IO workloads of the computer infrastructure and to adjust the host device cache size (e.g., increase cache size, decrease cache size, or disable the cache) to make sure the host device cache has the appropriate service levels.

In one arrangement, embodiments of the innovation relate to an apparatus and method for performing agentless remote IO caching analysis and for prediction and recommendation of IO caching parameters. These parameters can include behavior analysis, histogram analysis, and recommendation of the IO caching parameters. In one arrangement, embodiments of the innovation relate to a method for delivering IO caching analysis, prediction, and recommendation via a Graphical User Interface (GUI).

In one arrangement, embodiments of the innovation relate to a method for identifying input/output (IO) workload patterns within a computer infrastructure. The method includes receiving, by a host device, input/output (IO) access information associated with an IO workload, the IO access information identifying at least one of a read action and a write action associated with the IO workload over a period of time. Based upon the received IO access information associated with the IO workload, the method includes deriving, by the host device, a predicted cache access ratio associated with the IO workload, the predicted cache access ratio relating a predicted number of cache accesses associated with the IO workload with at least one of a total number of read actions and a total number of write actions associated with the IO workload. When the predicted cache access ratio reaches a threshold cache access ratio value the method includes identifying, by the host device, the IO workload as an IO workload candidate for caching by the host device.

In one arrangement, embodiments of the innovation relate to a host device, comprising a controller having a memory and a processor. The controller is configured to receive input/output (IO) access information associated with an IO workload, the IO access information identifying at least one of a read action and a write action associated with the IO workload over a period of time. The controller is configured to, based upon the received IO access information associated with the storage element, derive a predicted cache access ratio associated with the IO workload, the predicted cache access ratio relating a predicted number of cache accesses associated with the IO workload with at least one of a total number of read actions and a total number of write actions associated with the IO workload. The controller is configured to, when the predicted cache access ratio reaches a threshold cache access ratio value, identify the IO workload as an IO workload candidate for caching by the host device.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

FIG. 3 illustrates IO access information, according to one arrangement.

FIG. 6 is a reference count chart that identifies reference count values for logical block numbers associated with an IO workload, according to one arrangement.

DETAILED DESCRIPTION

Embodiments of the present innovation relate to an apparatus and method for performing agentless remote IO caching analysis, prediction, automation, and recommendation in a computer environment. In one arrangement, to limit latency without requiring the purchase of additional storage devices, a computerized device, such as a host device, is configured to identify blocks of IO workloads in a computer infrastructure that are candidates to be cached by the host device. The host device can be configured, such as by a caching utility, to identify blocks in the computer infrastructure that have been accessed, those that have been accessed repeatedly, and the IO workloads which can benefit from caching in the host device. Further, by monitoring and identifying IO workloads that are candidates for caching, the host device limits or eliminates the need for the systems administrator to guess at a cache hit rate, cache size, and IO block size for a particular IO workload in order to determine the IO caching parameters for the associated virtual machine to improve its performance.

For example, the host device is configured to analyze each individual workload that is running within a virtual machine (VM), in the computer environment, and suggest to a user, such as a systems administrator, the most suitable IO workloads for caching based upon a corresponding cache hit ratio. The host device is configured to provide this information as part of a graphical user interface. The host device is further configured to capture the percentage of Reads/Writes that should be considered, as well as, based on the analysis, predict/forecast the percentage of cache hit ratio (i.e., cache access ratio), cache size, latency, and IOPs improvement.

Figure 1:
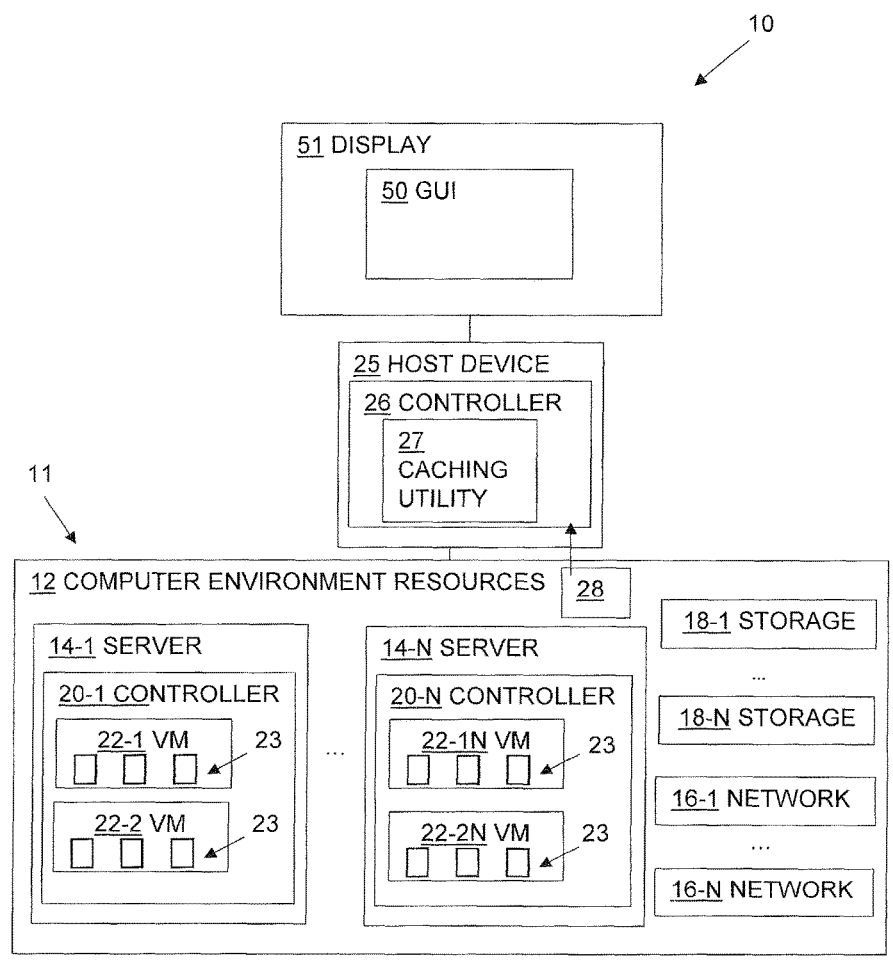
FIG. 1 illustrates a schematic representation of a computer system, according to one arrangement.

FIG. 1 illustrates an arrangement of a computer system 10 which includes at least one computer infrastructure 11 disposed in electrical communication with a host device 25. While the computer infrastructure 11 can be configured in a variety of ways, in one arrangement, the computer infrastructure 11 includes computer environment resources 12. For example, the computer environment resources 12 can include one or more server devices 14, such as computerized devices, one or more network communication devices 16, such as switches or routers, and one or more storage devices 18, such as disk drives.

Each server device 14 can include a controller or compute hardware 20, such as a memory and processor. For example, server device 14-1 includes controller 20-1 while server device 14-N includes controller 20-N. Each controller 20 can be configured to execute one or more virtual machines 22 with each virtual machine 22 being further configured to execute or run one or more applications or workloads 23. For example, controller 20-1 can execute a first virtual machine 22-1 and a second virtual machine 22-2, each of which, in turn, is configured to execute one or more IO workloads 23. Each compute hardware element 20, storage device element 18, network communication device element 16, and application 23 relates to an attribute of the computer infrastructure 11.

In one arrangement, the host device 25 is configured as a computerized device having a controller 26, such as a memory and a processor. The host device 25 is disposed in electrical communication with both the computer infrastructure 11, such as via a wired or wireless network, and with a display 51.

In one arrangement, the host device 25 is configured to model and derive the relationships associated with objects of the computer infrastructure resources 12. Such modeling and derivation provides a systems administrator with a substantially comprehensive view into the hierarchies of the multi-layered infrastructure resources 12 and allows the administrator to obtain a converged view model of the infrastructure 10, even as the attributes of the infrastructure 10 change over time.

Figure 4A:
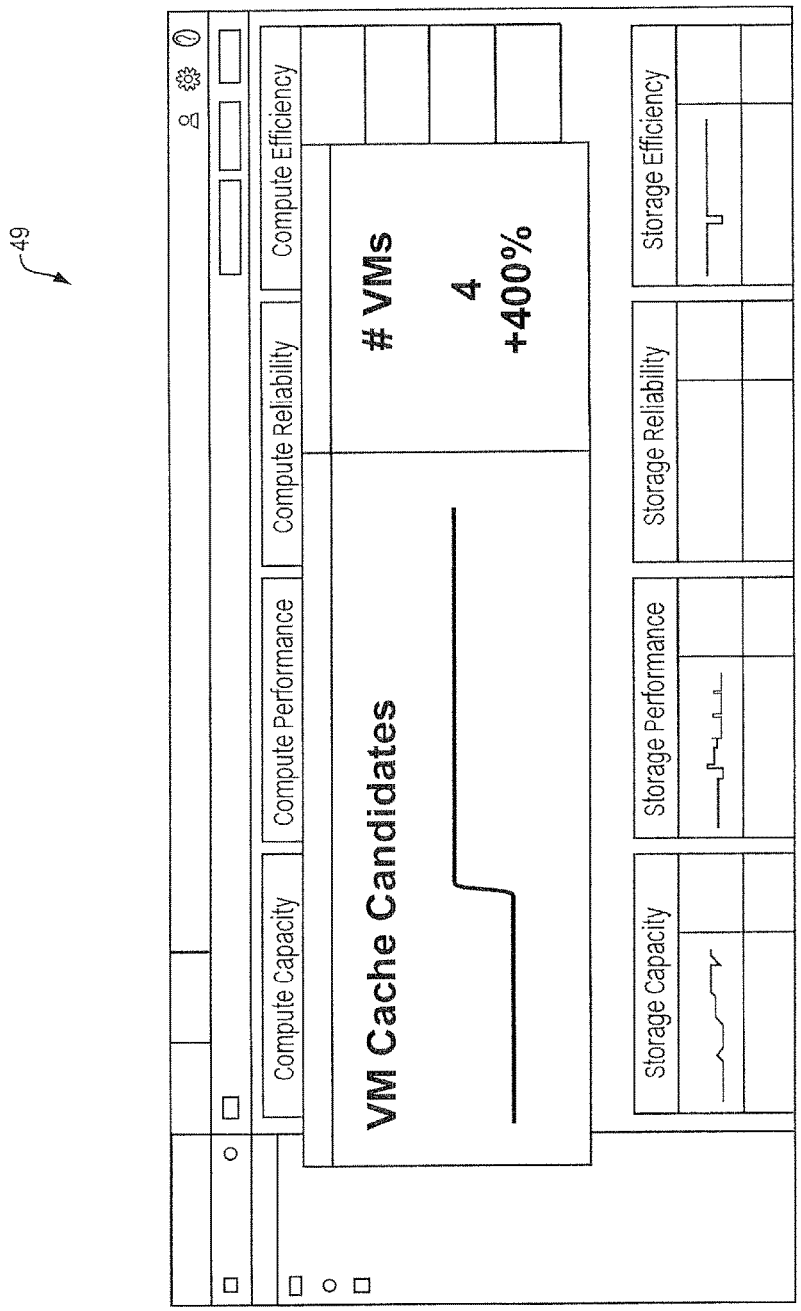
FIG. 4A illustrates a graphical user interface indicating the availability of IO workload candidates for caching, according to one arrangement.

In use, the host device 25 is configured to identify workload input/output (IO) patterns within the computer infrastructure 11 for caching and to provide a suggestion for cache configurations, such as host based cache configurations, to improve caching functionally. For example, as will be described below, based upon the analysis of each individual IO workload 23 that is running within a virtual machine 22, the host device 25 can detect the most suitable, or candidate, IO workloads for caching by the host device 25. Also as provided below, the host device 25 can then provide information regarding the availability of IO workloads to be cached, such as part of a graphical user interface 49 illustrated in FIG. 4A, and the most suitable IO workloads for caching, such as part of a graphical user interface 50 illustrated in FIG. 4B. By monitoring and identifying IO workloads 23 that are candidates for caching, the host device 25 limits or eliminates the need for the systems administrator to guess at a cache hit rate, cache size, and IO block size for a particular IO workload 23 in order to determine the IO caching parameters for the associated virtual machine 22 to improve its performance.

The following provides an example of analysis for host based caching. It is noted that embodiments of the innovation are not limited to host based caching but can be applied to any IO caching within the computer infrastructure, such as in a storage device 18 or storage area network (SAN), for example.

Figure 2:
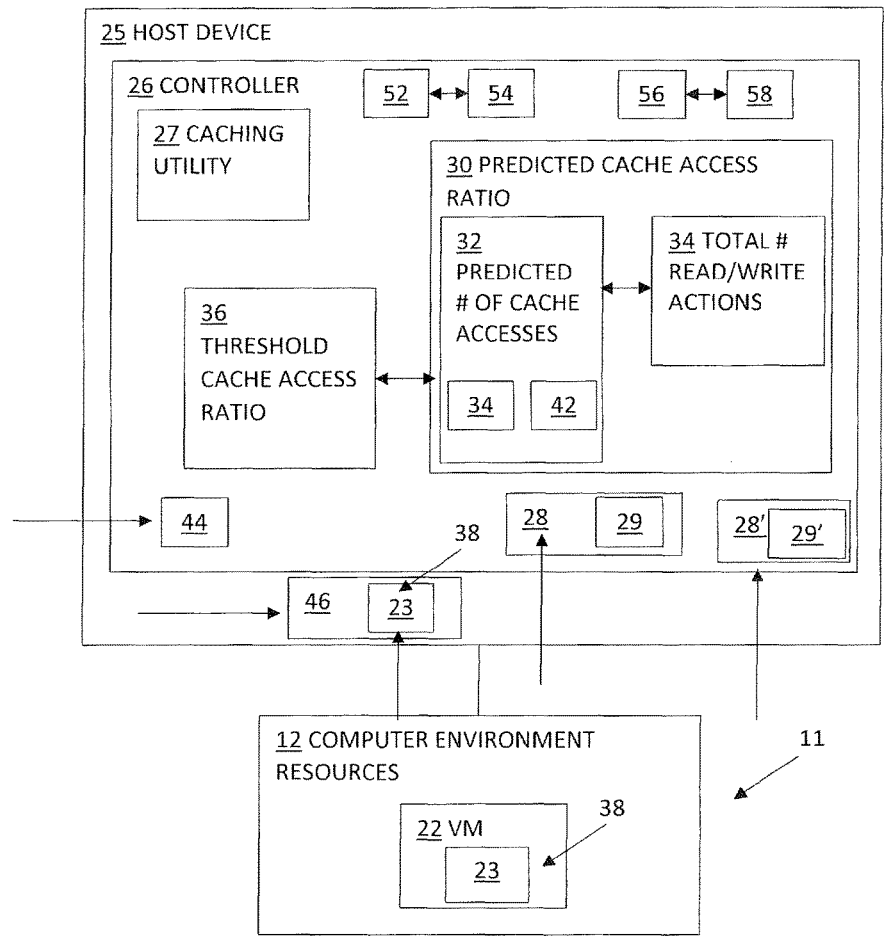
FIG. 2 illustrates a schematic representation of the host device of FIG. 1, according to one arrangement.

During operation, with additional reference to FIG. 2, the host device 25 is configured to receive input/output (IO) access information 28 associated with an IO workload 23 where the IO access information 28 identifies an IO action (e.g., at least one of a read action and a write action) 29 associated with the IO workload 23 over a period of time. For example, as illustrated in FIGS. 1 and 2, the host device 25 is configured with a caching utility 27 which retrieves the IO access information 28 associated with the IO workload 23 of a virtual machine 22 associated with the computer infrastructure 11. While the caching utility 27 can be configured in a variety of ways, in one arrangement, the caching utility 27 is configured as vscsiStats, which is provided by VMware (Palo Alto, Calif.). In one arrangement, the caching utility 27 is configured with a tracing option which can be used to record Small Computer System Interface (SCSI) IO command information or IO access information 28 (e.g., virtual disk performance statistics) associated with the IO workload 23 of the virtual machine 22.

In one arrangement, the caching utility 27 configures the host device 25 to record a variety of types of IO access information 28 related to an IO workload 23 of a virtual machine 22. For example, with reference to FIG. 3, the host device 25 can be configured to retrieve command type information 31, serial number information 33, IO block size information 35, number of scatter-gather elements information 37, logical block number information 39, timestamp information 41, and command latency information 43. In one arrangement, the IO access information 28 does not include customer sensitive data, but rather information to describe IO characteristics of the IO workload 23 toward a target virtual disk.

Returning to FIG. 2, based upon the received IO access information 28 associated with the IO workload 23, the host device 25 is configured to derive a predicted cache access or hit ratio 30 associated with the IO workload 23. As will be described below, the predicted cache access ratio 30 can relate a predicted number of cache accesses 32 associated with the IO workload 23 with at least one of a total number of read actions and a total number of write actions 34 associated with the IO workload 23.

For example, in order to determine the predicted cache access ratio 30 associated with the IO workload 23, the host device 25 is configured to first determine the total number of read actions 34 associated with the IO workload 23 of the virtual machine 22. This can be done by the host device 25 reference counting a number of references or pointers to each logical block number 39 of the received IO access information 28 associated with a particular virtual machine 22. In order to reference count the number of reads on each logical block number 39 within a particular (e.g., limited) time window, the host device 25 can leverage a version of a Most Recently Used (MLR) algorithm or the caching utility 27.

In one arrangement, reference counting of the reads of the received IO access information 28 makes several assumptions relative to certain aspects of the computer environment resources 12. For example, the reference counting assumes that physical storage of the computer environment resources 12 bottlenecks the IO workload 23; that a read/write ratio and the reference counting are sampled adequately to summarize the IO character of a guest OS/application, particularly over a period of time (e.g., 24 hours, 7 days, etc.); and that the read caching will be refreshed during a time window that is substantially equal to the time window executed during the tracing provided by the caching utility 27.

When performing the reference counting on the example IO access information 28 provided in FIG. 3, the host device 25 determines the following reference counts for each logical block number (LBN) 39:

| LBN | reference counts |
| --- | --- |
| 10754944 | 2 |
| 10755072 | 1 |
| 10755200 | 3 |
| 10756096 | 1 |
| 10757942 | 1 |

Based upon the IO access information 28 and the reference counting results provided above, the host device 28 determines the total number of read actions 34 for the IO workload 23 is equal to eight (8) (i.e., the sum of the reference counts for all of the logical block numbers 39 of the virtual machine 22). Further, based upon the IO access information 28 and the reference counting results provided above, the host device 28 can determine a read/write ratio of 8 for the IO workload 23 based upon the total number of read actions divided by the total number of write actions (i.e. 8 reads/1 write).

Returning to FIG. 2, the host device 25 is configured to next determine the predicted number of cache accesses 32 associated with the IO workload 23. This is based upon the total number of read actions 34 for the IO workload 23 determined above. For example, the predicted number of cache accesses 32 or hits associated with the IO workload 23 relates to a difference between the total number of read actions 34 associated with the IO workload 23 and a total number of unique read actions 42 associated with the IO workload 23 (i.e., predicted number of cache accesses=[total number of reads]−[total number of unique reads]).

Based upon the IO access information 28 and the reference counting results provided above, the host device 28 can determine the total number of unique read actions 42 associated with the IO workload 23 is equal to five (5) (i.e., the total number of unique read actions 42 for all of the logical block numbers 39 of the virtual machine 22). With this value determined, the host device 25 is can then determine the difference between the total number of read actions 34 (i.e., 8) for the IO workload 23 and the total number of unique read actions 42 (i.e., 5) associated with the IO workload 23 as the predicted number of cache accesses 32 associated with the IO workload 23 as follows:

predicted number of cache accesses: 8−5=3

Returning to FIG. 2, the host device 25 is configured to next determine the predicted cache access ratio 30 relating a predicted number of cache accesses 32 associated with the IO workload 23 with at least one of a total number of read actions and a total number of write actions 34 associated with the IO workload 23. In one arrangement, the predicted cache access ratio 30 relates to a ratio of the predicted number of cache accesses 32 and the total number of unique read actions 42 (i.e., predicted cache hit ratio=[predicted number of cache accesses]/[total number of reads]*100%). For example, based upon the values determined above, the host device 25 determines the predicted cache access ratio 30 associated with the IO workload 23 as follows:

predicted cache access ratio: (3/8)*100%=37.5%

With continued reference to FIG. 2, based upon the predicted cache access ratio 30, the host device 25 is configured to identify the IO workload 23 as an IO workload candidate for caching 38 when the predicted cache access ratio 30 reaches a threshold cache access ratio value 36. For example, assume the case where the host device 25 is configured with a threshold cache access ratio value 36 of 30%. In such a case, because the predicted cache access ratio 30 of 37.5% reaches (e.g., meets or exceeds) the threshold cache access ratio value 36 of 30%, the host device 25 identifies the IO workload 23 associated with the virtual machine 22 as being an IO workload candidate 38 for caching by the host device 25.

Figure 5:
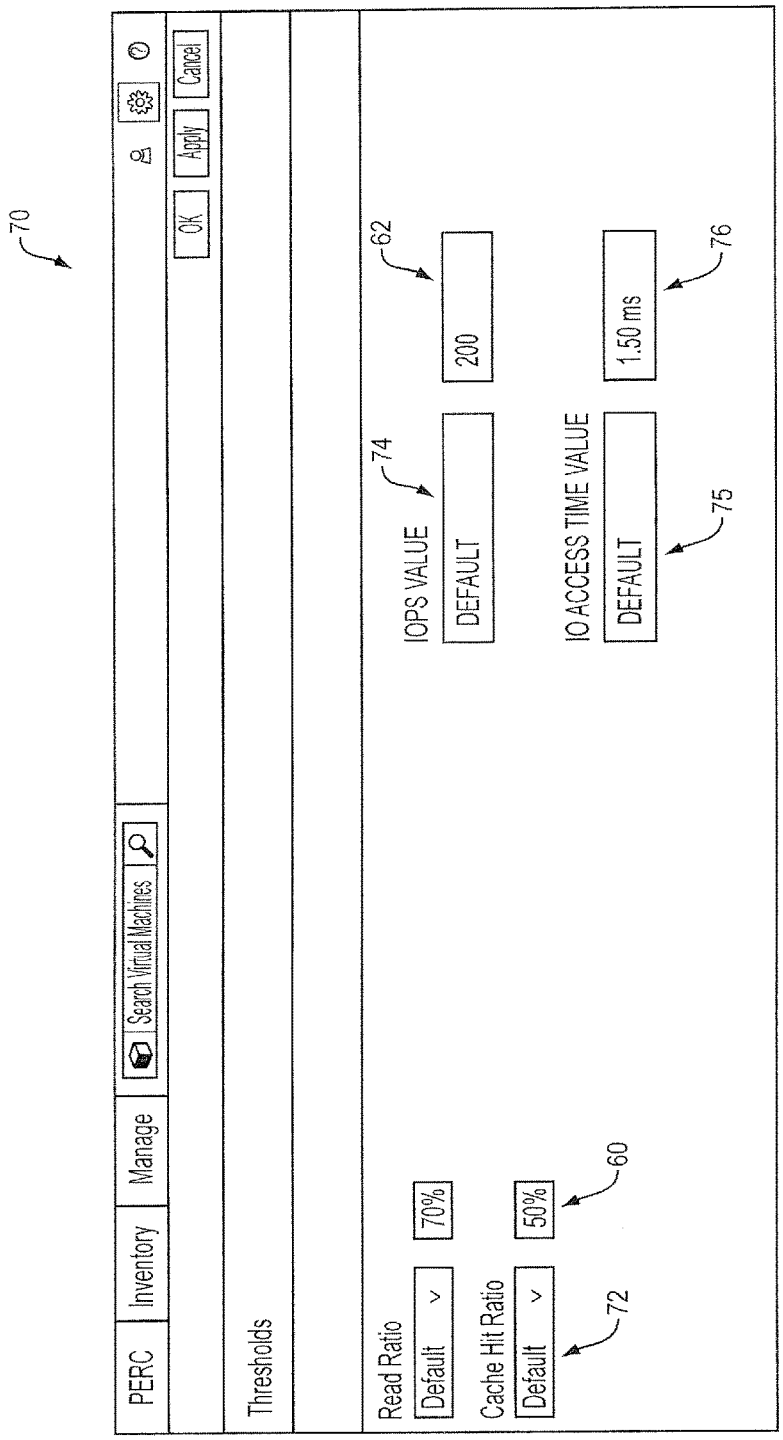
FIG. 5 illustrates a graphical user interface provided by the host device for user selection of a threshold cache access value and a threshold IO access time value, according to one arrangement.

While the host device 25 can be preconfigured with a threshold cache access ratio value 36, in one arrangement, with reference to FIG. 5, the host device 25 is configured to receive a user-selected threshold cache access ratio value 60 as the threshold cache access ratio value 36. For example, the host device 25 can provide a graphical user interface 70 having a control function 72 that allows a user to select a default threshold cache access ratio value 36 (shown) or to enter the user-selected threshold cache access ratio value 60. Use of the user-selected threshold cache access ratio value 60 allows the user, such as the systems administrator, to adjust an operational threshold value to either increase or decrease the number of IO workload candidates 38 provided to the user for caching by the host device 25.

In one arrangement, and as illustrated in FIG. 1, as a result the host device 25 identifying the IO workload 23 as being an IO workload candidate 38 for caching, the host device 25 is configured to display the IO workload candidate 38 on the display 51 as part of a graphical user interface (GUI) 50. For example, with additional reference to FIG. 4B, the host device 25 provides, as part of the GUI 50, a listing of IO workload candidates 38-1, 38-2 having cache access ratio values 30 which meet or exceed a given threshold cache access ratio value 36. The graphical user interface 50 can also provide a listing of the virtual machines 22 and the predicted cache access ratio 30 for each IO workload candidates 38-1, 38-2 for review by the systems administrator.

By identifying the IO workload candidates 38 for caching (e.g., host based caching), the host device 25 allows for improved operation of the computer environment resources 12 in the computer infrastructure 11. For example, by identifying IO workloads candidates 38 which can benefit from host based caching, a systems administrator can move the IO workloads 23 from the computer infrastructure 11 to a host based cache to reduce latency in the system 10. Further, by identifying IO workloads candidates 38, the host device 25 minimizes or eliminates the need for the systems administrator to guess at, and possibly mis-categorize, a cache hit rate, cache size, and IO block size for a particular virtual machine in order to determine the IO caching parameters for that virtual machine and to improve its performance.

As provided above, the host device 25 is configured to identify IO workloads 23 as candidates for caching, such as host based caching. In one arrangement, to improve the latency of the system 10, the host device 25 is also configured to perform the caching of the candidate IO workloads 38, as well.

For example, and with reference to FIG. 2, the host device 25 can transfer the IO workload candidates 38 from the virtual machine 22 of the computer environment resources 12 to a host cache 46 in response to receiving a caching command 44. In one arrangement, with additional reference to FIG. 4B, the host device 25 can receive a user-generated caching command 44 associated with an IO workload candidate 38 via the graphical user interface 50. As indicated, a systems administrator can select an execute function 80 or a schedule function 82 of the graphical user interface 50 for a selected IO workload candidate 38 to provide the caching command 44 to the host device 25 for the selected IO workload candidate 38. Alternately, the host device 25 can be configured to automatically receive the caching command 44, such as in response to the host device 25 identifying an IO workload 23 as an IO workload candidate for caching 38 can be either a user-generated or an automated command.

Next, in response to receiving the caching command 44 and with reference to FIG. 2, the host device 25 is configured to transfer the IO workload candidate 38 from the computer infrastructure 11 to a cache 46 associated with the host device 25. By transferring particular IO workloads 23 from the computer environment resources to the host based cache 46, the host device 25 improves system performance by reducing latency in the system 10.

As provided above, the predicted cache access ratio 30 is utilized by the host device 25 to determine if an IO workload 23 associated with the virtual machine 22 is an appropriate IO workload candidate 38 for caching by the host device 25. However, the host device 25 is configured to examine other factors associated with the IO workload 23 to determine if it is an appropriate candidate for caching as well, such as based upon a predicted IOPS increase 56 or an improvement in latency, termed an IO access time reduction 52.

In one arrangement, and with reference to FIG. 2, the host device is configured to identify an IO workload 23 as an IO workload candidate 38 for caching based upon a predicted improvement in Input/Output Operations per Second (IOPS) or predicted IOPS increase 56 associated with the IO workload 23.

With reference to FIG. 2, the host device 25 is configured to derive a predicted IOPS increase 56 associated with the IO workload 23 based upon the predicted cache access ratio 30, as well as based upon several assumptions relative to the computer environment resources 12. For example, assume that the physical storage layer is always the bottleneck of the workload and that the host device 25 utilizes all the blocks which have multiple number of references as caching for optimization. Further assume that the IO characterizing on a virtual disk is consistent after applying the host based caching; host based caching has zero penalty for data access when hits; IO latency of a unique read does not change after applying host based caching; and the predicted read cache hits is the "saved" bandwidth and is fully used for the workload improvements. Based upon these assumptions, the host device 25 is configured to detect IO improvements as provided by the following relationships.

For example, the relationship between the predicted improvement in IOPS 56 (i.e., predicted IOPS improvements) and the predicted cache hit ratio 30 can be provided as:

$$\text{predicted improvement in IOPS} = \text{predicted number of cache accesses}/(1-(\text{read ratio}*\text{predicted cache access ratio}))$$

where:

$$\text{predicted number of cache accesses} = \text{total number of reads} - \text{total number of unique reads};$$

$$\text{predicted cache hit ratio} = \text{predicted number of cache accesses}/(\text{total number of reads}*100\%);$$

and $$\text{read ratio} = \text{total number of reads}/\text{total number of IOs}$$

For example, based upon the values determined from the IO access information 28 provided in FIG. 3, the host device 25 determines the predicted improvement in IOPS 56 associated with the IO workload 23 for a particular virtual machine 22, as follows:

$$\text{predicted cache access ratio} = 3/8*100\% = 37.5\%$$

total number of IOs: 9
total number of reads: 8
read ratio: 8/9=0.89

$$\text{predicted number of cache accesses: } 8-5=3$$

$$\text{predicted improvement in IOPS} = 3/(1-(0.89*0.375)) = 4.5.$$

Next, with continued reference to FIG. 2, when the predicted IOPS increase 56 reaches a threshold IOPS value 58, the host device 25 is configured to identify the IO workload 23 as an IO workload candidate 38 for caching by the host device 25. For example, assume the case where the host device 25 is configured with a threshold IOPS value 58 of 200. In such a case, with respect to the above-referenced example, because the predicted IOPS increase 56 of 4.5 milliseconds does not reach (e.g., meets or exceeds) the threshold IOPS value 58 of 200, the host device 25 refrains from identifying the IO workload 23 associated with the virtual machine 22 as being an IO workload candidate 38 for caching by the host device 25.

Figure 4B:
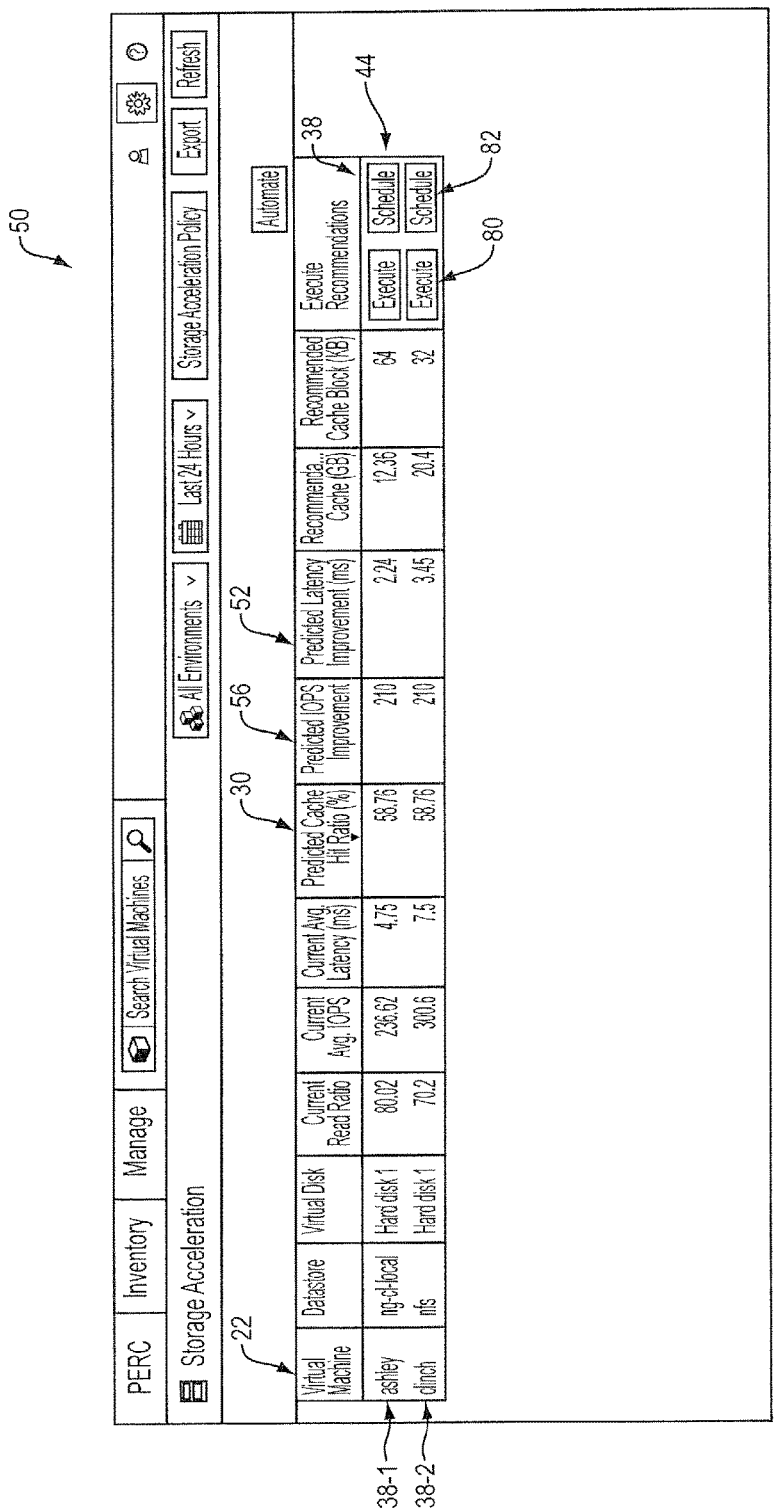
FIG. 4B illustrates a set of IO workload candidates for caching as provided via a graphical user interface by the host device, according to one arrangement.

In the case where the predicted IOPS increase 56 reaches (e.g., meets or exceeds) the threshold IOPS value 58, the host device 25 is configured to identify the IO workload 23 as being an IO workload candidate 38 for caching by displaying the IO workload candidate 38 on as part of a GUI 50, such as shown in FIG. 4B. For example, the host device 25 can provide a listing of IO workload candidates 38-1, 38-2 having a predicted IOPS improvement or increase 56 which meet or exceed a given threshold IOPS value 58. The graphical user interface 50 can also provide a listing of the virtual machines 22 and the predicted cache access ratio 30 for each IO workload candidates 38-1, 38-2 for review by the systems administrator.

While the host device 25 can be preconfigured with a threshold IOPS value 58, in one arrangement and with reference to FIG. 5, the host device 25 is configured to receive a user-selected threshold cache access ratio value 62 as the threshold IOPS value 58. For example, the host device 25 can provide a graphical user interface 70 having a control function 74 that allows a user to select a default threshold IOPS value 74 (shown) or to enter the user-selected threshold IOPS value 62. Use of the user-selected threshold cache access ratio value 62 allows the user, such as the systems administrator, to adjust the sensitivity of the threshold value to either increase or decrease the number of IO workload candidates 38 provided to the user for caching by the host device 25.

As provided above, the host device 25 can also be configured to determine if an IO workload 23 is an appropriate candidate for caching based upon an improvement in latency, termed an IO access time reduction 52, associated with the IO workload 23. For example, IO access time reduction 52 can be provided as:

$$\text{IO access time reduction (ms)} = \text{previous overall IO latency} - \text{predicted overall IO latency; where previous overall IO latency} = (\text{previous read latency}*\text{read ratio}) + (\text{previous write latency}*\text{write ratio})$$

$$\text{predicted overall IO latency (ms)} = \text{previous read latency}*((\text{previous IOPS})/(\text{previous IOPS} + \text{predicted improvement in IOPS})); \text{ and}$$

$$\text{predicted improvement in IOPS} = \text{predicted number of cache accesses}/(1-(\text{read ratio}*\text{predicted cache access ratio})).$$

In one arrangement, to determine the IO access time reduction 52 associated with the IO workload 23, based upon the values determined from the IO access information 28 provided in FIG. 3, the host device 25 can first determine the previous overall IO latency associated with the IO workload 23:
Total number of IOs: 9
Total number of reads: 8
Total number of writes: 1
Read ratio: 8/9
Write ratio: 1/9
Assuming a previous read latency=2 ms and a previous write latency=10 ms, the host device 25 determines the previous overall IO latency as:

$$\text{previous overall IO latency} = (2*8/9) + (10*1/9) = 2.89 \text{ ms}.$$

Next, to determine the predicted overall IO latency, the host device 25 first determines the predicted improvement in IOPS associated with the IO workload 23, as provided above:

predicted improvement in IOPS=predicted number of cache accesses/(1−(read ratio*predicted cache access ratio))=3/(1−(0.89*0.375))=4.5.

Next, the host device 25 determines the predicted overall IO latency. Assuming the previous read latency=2 ms and a previous IOPS=10, then the host device 25 determines the predicted overall IO latency as:

previous read latency*((previous IOPS)/(previous IOPS+predicted improvement in IOPS)=2*(10/(10+4.5))=1.38 ms Next, the host device 25 determines the IO access time reduction as: previous overall IO latency−predicted overall IO latency=2.89 ms−1.38 ms=1.63 ms.

Next, with continued reference to FIG. 2, when the IO access time reduction 52 reaches a threshold IO access time value 54, the host device is configured to identify the IO workload 23 as an IO workload candidate 38 for caching by the host device 25. For example, assume the case where the host device 25 is configured with a threshold IO access time value 54 of 1.50 ms. In such a case, because the IO access time reduction 52 reaches (e.g., meets or exceeds) the threshold IO access time value 54 of 1.50 ms, the host device 25 identifies the IO workload 23 associated with the virtual machine 22 as being an IO workload candidate 38 for caching by the host device 25.

In the case where the IO access time reduction 52 reaches (e.g., meets or falls below) the threshold IO access time value 54, the host device 25 is configured to identify the IO workload 23 as being an IO workload candidate 38 for caching by displaying the IO workload candidate 38 on as part of a GUI 50, such as shown in FIG. 4B. For example, the host device 25 can provide a listing of IO workload candidates 38-1, 38-2 having an IO access time reduction 52 which meet or falls below a given threshold IO access time value 5. The graphical user interface 50 can also provide a listing of the virtual machines 22 for each IO workload candidates 38-1, 38-2 for review by the systems administrator.

While the host device 25 can be preconfigured with threshold IO access time value 54, in one arrangement, the host device 25 is configured to receive a user-selected threshold IO access time value 76 as the threshold IO access time value 54. For example, the host device 25 can provide the graphical user interface 70 having a control function 75 that allows a user to select a default threshold IO access time value (shown) or to enter the user-selected threshold IO access time value 76. Use of the user-selected threshold IO access time value 76 allows the user, such as the systems administrator, to adjust the sensitivity of the threshold value to either increase or decrease the number of IO workload candidates 38 provided to the user for caching by the host device 25.

Returning to FIG. 2, in one arrangement, the host device 25 is further configured to provide a suggestion for cache configurations, such as host based cache configurations, to improve caching functionally. For example, the host device 25 is configured to monitor the host device cache 46 to determine if it needs to be adjusted for an IO workload 23 which constantly changes.

In one arrangement, the host device 25 receives updated IO access information 28' associated with the IO workload 23 of the host device cache 46 where the updated IO access information 28 identifies at least one of an updated IO action (i.e., a read action and/or a write action) 29' associated with the IO workload 23 over a period of time. For example, the updated IO access information 28' can indicate an increase or decrease in the number of reads and/or writes associated with the host device cache 46, as well as the logical block numbers accessed.

Based upon the updated IO access information 28', the host device 25 can adjust the cache size of the host based cache 46. For example, by identifying a change in the IO workload 23 associated with the host based cache 46, the host device 25 can determine a change in the cache size needed based upon the relationship: cache size=number of logical blocks having multiple references*block size. The change in the IO workload can drive the host device 25 to either increase the cache size, decrease the cache size, or disable the cache 46 to ensure that the host device cache 46 has appropriate service levels.

As provided above, based upon the received IO access information 28 associated with the IO workload 23, the host device 25 is configured to derive a predicted cache access ratio 30, or predicted cache hit ratio, associated with the IO workload 23 using reference counting. In one arrangement, the host device 25 is configured to provide results of the reference counting as part of a histogram 100, such as illustrated in FIG. 7, to allow the systems administrator to identify an IO workload 23 as an IO workload candidate 38 for caching and to provide the systems administrator with the ability to customize a caching strategy and with a more flexible way to perform an optimization.

Figure 6:
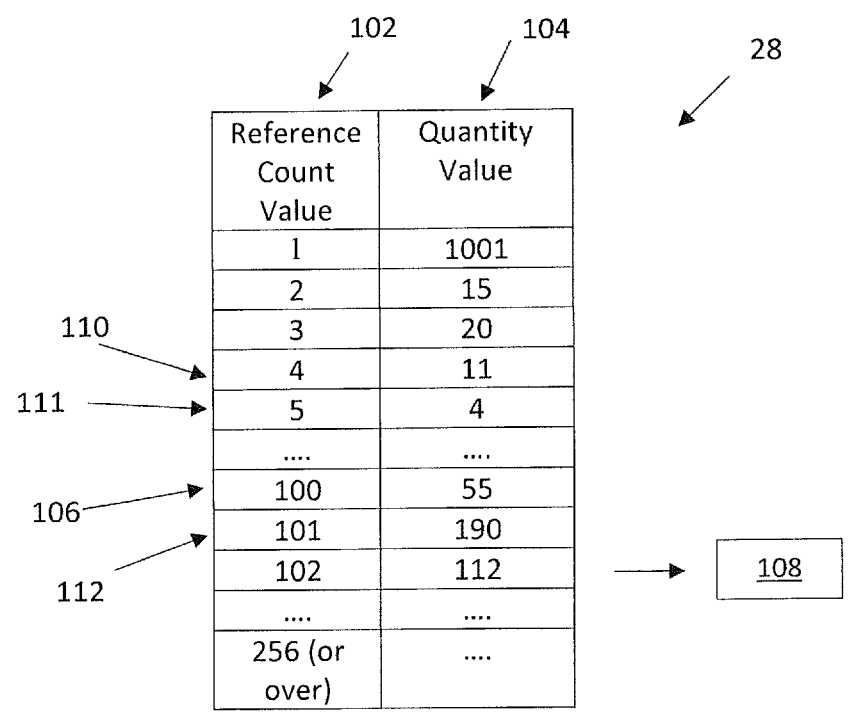

During operation, and with reference to FIG. 6, the host device 25 configured to receive as part of the IO access information 28, a reference count value 102 for each logical block number 39 associated with the IO workload 23. The reference count value 102 identifies a number of references on the same logical block number 39. Next, the host device 25 is configured to detect a quantity value 104 for each logical block number associated with the IO workload, the quantity value 104 identifying a number of reference counters which have the same value of reference counts. For example, with reference to FIG. 6, the entry 106 indicates that there are a fifty-five (55) logical block number 39 that were referenced 100 times during a tracing time window.

Next, for each logical block number 39, the host device 25 is configured to identify an IO workload 23 associated with the logical block number 39 as a candidate data for caching by the host device 25 when a product of the reference count value 102 and the quantity value 104 reaches a threshold value 108.

Figure 7:
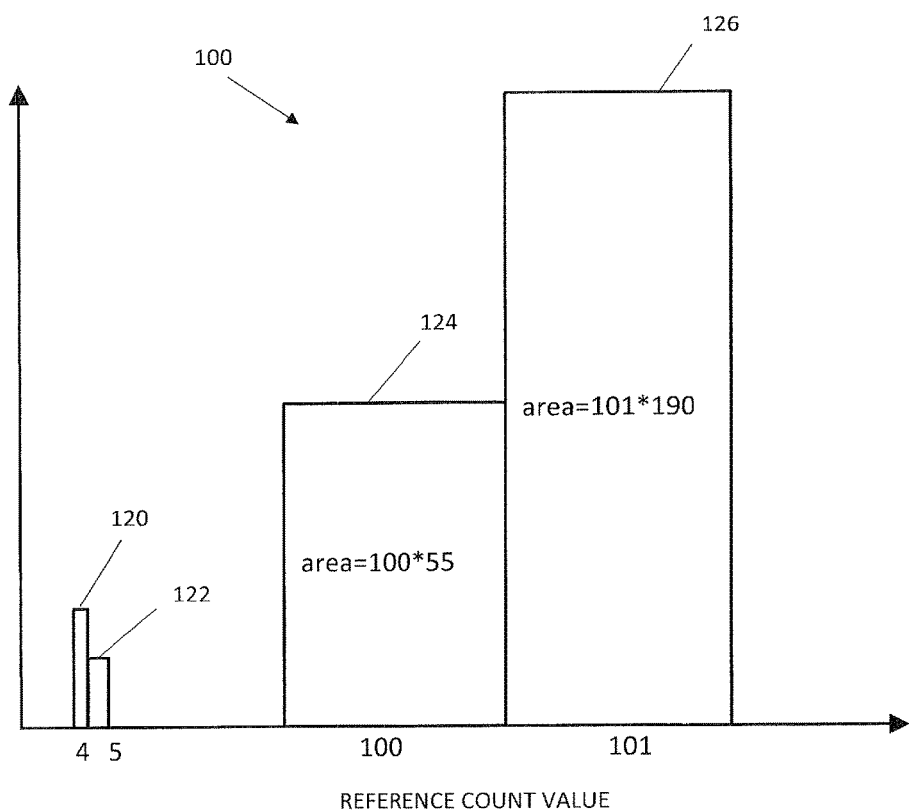
FIG. 7 illustrates a histogram showing a product of a reference count value and a quantity value for each logical block number of the reference count chart of FIG. 6, according to one arrangement.

For example, the host device 25 can provide the product of the reference count value 102 and the quantity value 104 as a histogram chart 100, as illustrated in FIG. 7. In one arrangement, the threshold value 108 is configured as an area of each histogram element provided by the histogram chart. As illustrated, histogram element 120 illustrates the product of the reference count value 102 and the quantity value 104 for entry 110 of FIG. 6 while histogram element 122 illustrates the product of the reference count value 102 and the quantity value 104 for entry 111 of FIG. 6. Further, histogram element 124 illustrates the product of the reference count value 102 and the quantity value 104 for entry 106 of FIG. 6 while histogram element 126 illustrates the product of the reference count value 102 and the quantity value 104 for entry 112 of FIG. 6 As shown by the histogram chart 100, histogram elements 124 and 126 for reference counts 100 and 101, respectively, have a greater area than the histogram elements 120 and 122 for reference counts 101 and 102, respectively. Accordingly, reference counts 100 and 101 identify to the systems administrator the most significant blocks and IO workloads which should be considered as cache candidates. Accordingly, the systems administrator can identify the blocks associated with histogram elements 124 and 126 as being valuable to cache when the caching resource is limited.

The histogram data can also be utilized to determine that by using a smaller cache size, a significant benefit can still be achieved. The systems administrator can determine, for example, that with ¼ of the recommended cache size, a 50% speedup (increased IOPs) can still be realized.

While various embodiments of the innovation have been particularly shown and described, it will be understood by those skilled in the art that various changes in form and details may be made therein without departing from the spirit and scope of the innovation as defined by the appended claims.

As provided above, the host device 25 is configured to examine predicted cache access ratio 30, predicted IOPS increase 56, or IO access time reduction 52 to determine if an IO workload 23 associated with the virtual machine 22 is an appropriate IO workload candidate 38 for caching. In one arrangement, the host device 25 is configured to review the read ratio as well determine if an IO workload 23 associated with the virtual machine 22 is an appropriate IO workload candidate 38. The host device 25 can compare a read ratio with a read ratio threshold, which can be preset or user adjusted, to detect if an IO workload 23 is a candidate for caching.

While the host device 25 can be preconfigured with threshold IO access time value 54, in one arrangement, the host device 25 is configured to receive a user-selected threshold IO access time value 76 as the threshold IO access time value 54. For example, the host device 25 can provide the graphical user interface 70 having a control function 75 that allows a user to select a default threshold IO access time value (shown) or to enter the user-selected threshold IO access time value 76.

As provided above, based upon the IO access information 28, the host device 25 is configured to identify workload input/output (IO) patterns within the computer infrastructure 11 for caching. It is noted that the host device 25 is configured to identify such workload patterns in a substantially continuous manner. For example, the host device 25 can receive the IO access information 28 as a stream from the computer infrastructure 11 and can identify changing IO workloads 23 and changing IO workload caching candidates over time.

What is claimed is:

1. In a host device, a method for identifying input/output (IO) workload patterns within a computer infrastructure, comprising:
   receiving, by the host device, input/output (IO) access information associated with an IO workload, the IO access information identifying at least one of a read action and a write action associated with the IO workload over a period of time;
   based upon the received IO access information associated with the IO workload, deriving, by the host device, a predicted cache access ratio associated with the IO workload, the predicted cache access ratio relating a predicted number of cache accesses associated with the IO workload with at least one of a total number of read actions and a total number of write actions associated with the IO workload; and
   when the predicted cache access ratio reaches a threshold cache access ratio value identifying, by the host device, the IO workload as an IO workload candidate for caching by the host device.

2. The method of claim 1, wherein the predicted number of cache accesses associated with the IO workload relates to a difference between the total number of read actions associated with the IO workload and a total number of unique read actions associated with the IO workload.

3. The method of claim 1, further comprising:
   receiving, by the host device, a caching command associated with the IO workload candidate; and
   in response to receiving the caching command, transferring, by the host device, the IO workload candidate from the computer infrastructure to a cache associated with the host device.

4. The method of claim 3, comprising:
   receiving, by the host device, updated IO access information associated with the IO workload of the cache associated with the host device, the updated IO access information identifying at least one of an updated read action and an updated write action associated with the IO workload over a period of time; and
   adjusting, by the host device, a cache size of the cache associated with the host device based upon the updated IO access information.

5. The method of claim 4, wherein adjusting the cache size of the cache associated with the host device based upon the updated IO access information comprises one of increasing the cache size of the cache, decreasing the cache size of the cache, and dismantling the cache.

6. The method of claim 3, wherein:
   receiving IO access information associated with the IO workload comprises receiving, by the host device, a reference count value for each logical block number associated with the IO workload, the reference count value identifying number of references on the same logical block number over a period of time; and
   further comprising:
   detecting, by the host device, a quantity value for each logical block number associated with the IO workload, the quantity value identifying a set of logical block numbers having the same reference count value;
   for each logical block number, when a product of the reference count value and the quantity value reaches a threshold value, identifying, by the host device, the IO workload associated with the logical block number as a candidate data for caching by the host device.

7. The method of claim 1, further comprising receiving, by the host device, as the threshold cache access ratio value, a user-selected threshold cache access ratio value.

8. The method of claim 1, further comprising:
   based upon the predicted cache access ratio, detecting, by the host device, an IO access time reduction associated with the IO workload; and
   when the IO access time reduction reaches a threshold IO access time value, identifying, by the host device, the IO workload as an IO workload candidate for caching by the host device.

9. The method of claim 8, further comprising receiving, by the host device, as the threshold IO access time value, a user-selected threshold IO access time value.

10. The method of claim 1, further comprising:
    based upon the predicted cache access ratio, deriving, by the host device, a predicted Input/Output Operations Per Second (IOPS) increase associated with the IO workload; and
    when the predicted IOPS increase reaches a threshold IOPS value, identifying, by the host device, the IO workload as an IO workload candidate for caching by the host device.

11. The method of claim 10, further comprising receiving, by the host device, as the threshold IOPS value, a user-selected threshold IOPS value.

12. A host device, comprising:
a controller having a memory and a processor, the controller configured to:
receive input/output (IO) access information associated with an IO workload, the IO access information identifying at least one of a read action and a write action associated with the IO workload over a period of time;
based upon the received IO access information associated with the IO workload, derive a predicted cache access ratio associated with the IO workload, the predicted cache access ratio relating a predicted number of cache accesses associated with the IO workload with at least one of a total number of read actions and a total number of write actions associated with the IO workload; and
when the predicted cache access ratio reaches a threshold cache access ratio value, identify the IO workload as an IO workload candidate for caching by the host device.

13. The host device of claim 12, wherein the predicted number of cache accesses associated with the IO workload relates to a difference between the total number of read actions associated with the IO workload and a total number of unique read actions associated with the IO workload.

14. The host device of claim 12, wherein the controller is further configured to:
receive a caching command associated with the IO workload candidate; and
in response to receiving the caching command, transfer the IO workload candidate from the computer infrastructure to a cache associated with the host device.

15. The host device of claim 14, wherein the controller is configured to:
receive updated IO access information associated with the IO workload of the cache associated with the host device, the updated IO access information identifying at least one of an updated read action and an updated write action associated with the IO workload over a period of time; and
adjust a cache size of the cache associated with the host device based upon the updated IO access information.

16. The host device of claim 15, wherein when adjusting the cache size of the cache associated with the host device based upon the updated IO access information, the controller is configured to one of increase the cache size of the cache, decrease the cache size of the cache, and dismantle the cache.

17. The host device of claim 14, wherein:
when receiving IO access information associated with the IO workload, the controller is configured to receive a reference count value for each logical block number associated with the IO workload, the reference count value identifying a number of references on the same logical block number over a period of time; and
wherein the controller is further configured to:
detect a quantity value for each logical block number associated with the IO workload, the quantity value identifying a set of logical block numbers having the same reference count value;
for each logical block number, when a product of the reference count value and the quantity value reaches a threshold value, identify the IO workload associated with the logical block number as a candidate data for caching by the host device.

18. The host device of claim 12, wherein the controller is further configured to receive, as the threshold cache access ratio value, a user-selected threshold cache access ratio value.

19. The host device of claim 12, wherein the controller is further configured to:
based upon the predicted cache access ratio, detect an IO access time reduction associated with the IO workload; and
when the IO access time reduction reaches a threshold IO access time value, identify, by the host device, the IO workload as an IO workload candidate for caching by the host device.

20. The host device of claim 19, wherein the controller is further configured to receive as the threshold IO access time value, a user-selected threshold IO access time value.

21. The host device of claim 12, wherein the controller is further configured to:
based upon the predicted cache access ratio, derive a predicted Input/Output Operations Per Second (IOPS) increase associated with the IO workload; and
when the predicted IOPS increase reaches a threshold IOPS value, identify the IO workload as an IO workload candidate for caching by the host device.

22. The host device of claim 21, wherein the controller is further configured to receive as the threshold IOPS value, a user-selected threshold IOPS value.

* * * * *